March 23, 1965   J. D. SLOAN   3,174,616

CONVEYOR CHAIN AND ATTACHMENT

Filed Oct. 15, 1962

United States Patent Office 3,174,616
Patented Mar. 23, 1965

3,174,616
CONVEYOR CHAIN AND ATTACHMENT
John D. Sloan, East Longmeadow, Mass., assignor to Rex Chainbelt Inc., a corporation of Wisconsin
Filed Oct. 15, 1962, Ser. No. 230,401
4 Claims. (Cl. 198—189)

This invention relates to conveyor chain and in particular to special attachment links providing relatively spaced and hardened bearing supports for carrying chain attachments. The link itself can also serve as a "pusher" to engage directly the article to be conveyed on or alongside the chain or as a "trip" to engage a cam or lever.

The chain comprises alternate bushing links and pin links. The hardened pins of the pin links are hollow and are turnable in the bushings of the bushing links for the articulation of adjacent links at the joints of the chain.

The distance between centers of adjacent joints of the chain is referred to as the "pitch." A uniform pitch is required so that the chain may be operated over one or more sprockets.

According to the present invention, the pusher or special link comprises a triangle formed by two adjacent links of the chain and a connector link which is added to the chain. The triangle is formed by drawing together any two joints of the chain spaced by one intermediate joint. The pins of the connector link are then extended through the two joints of the chain which were drawn together and so that the plates of the connector link overly the ends of the hollow pins of the joints. The connector link functions as a regular part of the chain and for that purpose the pins are spaced so that the joints which were drawn together are then spaced a distance equal to the pitch of the chain. A particular feature of the invention resides in the fact that the triangle may be formed anywhere required along the length of the chain and, in effect, moved without removing the chain from the sprockets.

The drawings furnished herewith illustrate the best mode of carrying out the invention as presently contemplated and set forth hereinafter.

Figure 1:
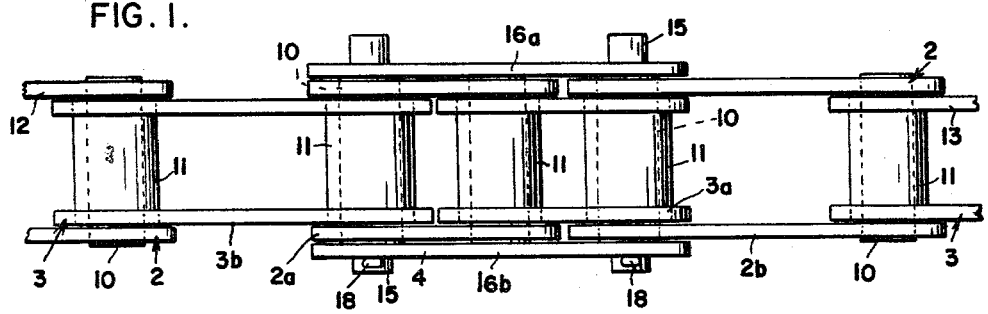
FIGURE 1 is a plan view of a section of a chain including a pusher.
Figure 2:
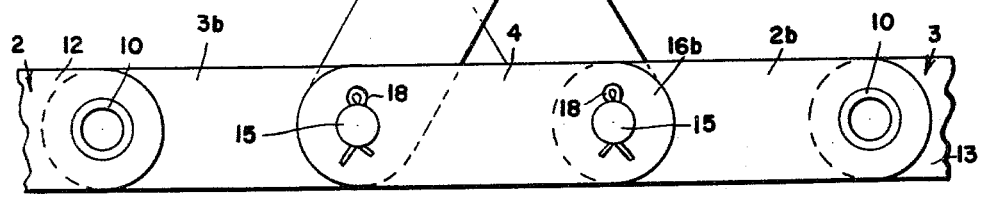
FIG. 2 is a side view of the section of chain shown in FIGURE 1.

The chain shown in the drawings includes the pin links 2 and bushing links 3. The connector link 4 joins the adjacent links 2a and 3a to form the triangular pusher or special link and also connects the links 2b and 3b adjoining the triangle to function as a regular part of the chain.

The hollow pins 10 of each pin link 2 are turnable in the respective bushings 11 of the adjacent bushing links 3. Each link 2 and 3 includes plates 12 and 13, respectively, having holes in which the corresponding ends of the pins and bushings of each link are secured with a tight fit. As shown, the ends of pins 10 may project slightly from plates 12 for a slightly better securement of the plates on the hollow pins.

The connecting link 4 includes the pins 15 and plates 16a and 16b. Plate 16a is tightly fitted over the plain projecting ends of pins 15 which may be solid as shown. The respective opposite ends of pins 15 are fitted with the removable cotter pins 18 to secure plate 16b on the ends of the pins referred to.

As shown, plates 16a and 16b abut the ends of pins 10 of link 2a and of link 2b. Pins 15 extend through pins 10 of links 2a and 2b so that the effective pitch of link 4 is the same as the other links of the chain whereby the chain operates smoothly over a sprocket, not shown. The chain is particularly adapted to be built to fit conventional roller chain or other sprockets.

Figure 3:
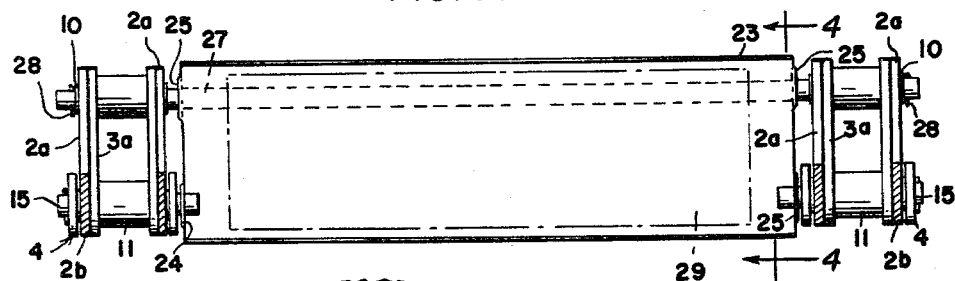
FIG. 3 is a horizontal section through two spaced strands of chain operating vertically and carrying a pan and shown in plan and on which an article is placed and supported.
Figure 4:
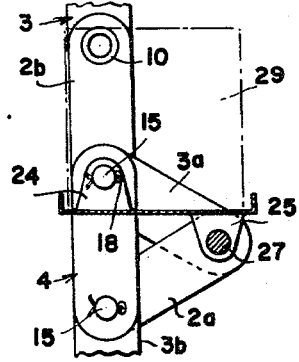
FIG. 4 is a cross-section taken on line 4—4 of FIG. 3.

Two chains are shown in FIG. 3 operating vertically and have special links located directly opposite each other for the support of the pan 23 therebetween. Pan 23 is provided with the brackets 24 and 25 extending upwardly and downwardly, respectively, from the ends of pan 23. The ends of the upper pins 15 of link 4 extend through holes in brackets 24 and the rod 27 beneath the pan extends through holes in brackets 25 and the pins 10 of pin links 2a of the chain. Removable cotter pins 28 at each end of rod 27 secure the latter in the pins 10 referred to.

Upper pins 15 and rod 27 support pan 23 horizontally to carry the article 29, for example, in a vending machine, not shown.

According to the invention, pan 23 or the like may be located anywhere along the length of the chains and any number of similar pans or the like may be attached to the chain. Since forming each attachment link reduces the length of the chain by one pitch or link, links must be added or removed accordingly. However, the invention contemplates installation of the chain with the maximum number of special links which might be required since the unused special links do not interfere with the operation of the chain. Since the special links may be formed anywhere along the length of the chain, they may, in effect, be moved as required, for example by the size of the articles to be carried on each pan 23.

As in the usual steel chain construction, the pins are of hardened steel for resistance to wear and improved chain life. Accordingly, any of hollow pins 10 will provide, wherever required along the length of the chain, a hardened bearing as for rod 27, or other bolt not shown.

Where the triangular structure is to engage a lever or cam as a "trip," the bushings 11 of the chain may be provided with rollers as in the usual construction of roller chain. Such a roller, not shown, will reduce the wear of the part being engaged in the same manner that the other rollers serve to reduce the wear of the sprockets driving the chain.

Various modes of carrying out the invention are contemplated as within the scope of the following claims particularly pointing out and distinctly claiming the subject matter which is regarded as the invention.

I claim:

1. In a chain for conveying articles comprising a series of links connected by joints of uniform spacing for operation over a sprocket, said series of links comprising alternate bushing links and pin links having bushings and hollow pins, respectively, each joint comprising a hollow pin turnable in a bushing, a connector link comprising a plate on each side of the chain and connector pins extending through the hollow pins of two joints of the chain having one intermediate joint, said connector pins being spaced so that the spacing of said two joints corresponds with said uniform spacing and so that the connector link and the two links between said two joints form a rigid, triangular structure for the direct engagement or support of the device or article to be moved or conveyed, the base of said triangular structure being formed by the chain and one of the hollow pins of the chain being at the apex of the triangle to engage the device to be moved.

2. The invention of claim 1 wherein at least one plate of the connector link is readily removable from the connector pins of said link and said connector pins include removable means for securing said plate on said connector pins, whereby said connector link may be removed and relocated to form the rigid triangular structure anywhere along the length of the chain.

3. In a conveyor chain including pin links and bushing links, each pin link having spaced hollow pins and side plates connecting the corresponding ends of the hollow pins, each bushing link having spaced bushings and side plates connecting the corresponding ends of the bushings, said pin links and bushing links being alternately arranged with the hollow pins extending through and turnable in corresponding bushings to form joints of uniform spacing, a triangular structure including a bushing link and an adjacent pin link and a connector link having connector pins and plates connecting the ends of said connector pins with said connector pins extending through the hollow pins of the joints of said last named links whereby said connector link forms the base of the triangular structure.

4. In a conveyor chain comprising a series of links connected by joints of uniform spacing for operation over a sprocket, said series of links comprising alternate bushing links and pin links having bushings and hollow pins, respectively, each joint comprising a hollow pin turnable in a bushing, a connector link comprising connector pins and plates connecting the ends of said connector pins, said connector pins being dimensioned and spaced to extend through the hollow pins of the first and third of any three joints of the chain and so that the connector link and the two adjacent links of the chain intermediate said first and third joints form a rigid, triangular structure as for the direct engagement or support of an article to be conveyed.

References Cited in the file of this patent

FOREIGN PATENTS 406,725     Germany _____ Dec. 2, 1924